UNITED STATES PATENT OFFICE.

HARRY P. BASSETT, OF CATONSVILLE, MARYLAND, ASSIGNOR TO THE SPAR CHEMICAL COMPANY, OF BALTIMORE, MARYLAND, A CORPORATION OF MARYLAND.

PROCESS OF PRODUCING A SOLUBLE POTASSIUM COMPOUND.

1,217,388.  Specification of Letters Patent.  Patented Feb. 27, 1917.

No Drawing.  Application filed March 8, 1915. Serial No. 12,932.

*To all whom it may concern:*

Be it known that I, HARRY P. BASSETT, a citizen of the United States, residing at Catonsville, in the county of Baltimore and State of Maryland, have invented certain new and useful Improvements in Processes of Producing a Soluble Potassium Compound, of which the following is a specification.

This invention relates to processes of producing water soluble potassium salts from materials containing insoluble potassium salts, such for example as feldspathic rock, green sand marl and the like, in order to separate or recover potash or potassium salts therefrom, and has particular reference to certain improvements in processes of decomposing the potassium containing alkali silicates by means of sodium acid sulfate, one improvement consisting in so proportioning the sodium acid sulfate to the insoluble alkaline silicate that radical and important results in respect of lowering the cost of the resulting potassium product are effected and a second improvement consisting in the employment with the alkali silicate, of an agent or reagent adapted to absorb sulfuric acid, or more properly, sulfur trioxid which is liberated during the reaction which occurs in the process referred to.

Other objects and advantages will be apparent in the course of the following specification.

In decomposing insoluble potassium containing alkali metal silicates by means of sodium acid sulfate, or such sulfate and a reducing agent, I have found that the yield of soluble potassium salts is very materially increased if the reaction is carried out in the presence of a reagent, such as water, which absorbs the sulfur trioxid produced in such reaction. From my investigations it appears that this improved yield of soluble potassium salt or salts results from the absorbent action of the reagent employed whereby the sulfur trioxid is brought more intimately into, and maintained for a longer time in, contact with the silicate to be decomposed.

In the preferred practice of my process, I employ green sand marl (glauconite) although pulverized feldspar may be advantageously used. It is advantageous to grind the material to pass through a twenty mesh sieve and better results are obtained if it is ground to forty or sixty mesh, although the expense of further grinding may more than compensate for the advantage resulting from the additional fineness of the material under treatment. The insoluble potassium silicate is mixed with sodium acid sulfate in any proportions desired although I greatly prefer to mix the insoluble silicate with a materially smaller amount by weight of the acid sulfate, preferable with from approximately one half to three fourths by weight of the acid sulfate. To this may be advantageously added a reducing agent such as coke in approximately from one to three per cent. by weight of the mixture. I have obtained the best results by mixing the silicate and acid sulfate in the following proportions by weight:

Potassium containing silicate___ 2000 parts.
Sodium acid sulfate_____ 1500 parts.

To the mixture I may advantageously add the sulfur trioxid absorbing agent which, in the case of water which I prefer to use, is added in such quantity that when the mixture is squeezed in the hand it will retain the shape given to it. I have obtained the best results by adding water in the proportions of from 20 to 25 per cent. by weight of the mixture, although a materially greater amount of water may be added without material disadvantage except that an unnecessarily large amount of heat is required for its vaporization. The mixture is then heated to a reacting temperature, the mixture being furnaced, preferably in a tube furnace or the like at a red heat, the preferred temperature being approximately from 900° to 1000° F. Instead of adding water to the mixture, the whole or a part of the water may be added as steam during the heating operation but the cooling effect of the steam is such that it is ordinarily not advisable to introduce more than a fourth to a half of the water required in this way. Coke may be added to the mixture before furnacing it or the mixture may be advantageously subjected to the action of a reducing flame while being furnaced.

From the foregoing description it is obvious that I progressively heat the mixture of the insoluble potassium containing silicate, acid sulfate decomposable by heat and water, whereby the portion of the mixture near the end of the progressive heating is dried and heated to a reacting temperature for producing sulfur trioxid by the decomposition of the acid sulfate, and conduct the sulfur trioxid thus produced into contact with the portion of the mixture near the beginning of the progressive heating and which portion contains the water, so that the sulfur trioxid is absorbed by the water.

After heating the mixture to a reacting temperature as described the resulting fused mass is allowed to cool and leached with water. The leaching operation results in the production of a solution containing sodium and potassium sulfates which may be separated by any suitable process such for example, as my process described and claimed in Patent No. 1,091,033, granted March 24, 1914.

While I have described in detail the preferred embodiment of my process and the proportions of ingredients, it is to be understood that the details of procedure and proportions of reagents may be varied and that known chemical equivalents of the materials may be employed without departure from the spirit of my invention or the scope of the subjoined claims.

In a copending application, Serial No. 40,031 filed July 15, 1915 for process of producing potassium salts I have described and claimed a process of heating to a reacting temperature a potassium containing silicate, a metal sulfate, a reducing agent and sulfuric acid, and such process is not specifically claimed herein. In the copending application Serial No. 40,031, I employ an alkaline earth metal sulfate, namely, calcium sulfate, while in the present application I employ sodium acid sulfate.

Having described my invention, I claim:—

1. The herein described process of obtaining soluble potassium salts, which consists in progressively heating a mixture of an insoluble potassium containing silicate, an acid sulfate decomposable by heat, and a sulfur trioxid absorption agent, whereby the mixture near the end of the progressive heating is heated to a reaction temperature for producing sulfur trioxid, and conducting the sulfur trioxid thus produced into contact with the portion of the mixture near the beginning of the progressive heating, so that the sulfur trioxid is absorbed by the sulfur trioxid absorption agent.

2. The herein described process of obtaining soluble potassium salts which consists in progressively heating a mixture of an insoluble potassium containing silicate, an acid sulfate decomposable by heat, a reducing agent, and a sulfur trioxid absorption agent, whereby the portion of the mixture near the end of the progressive heating is dried and heated to a reaction temperature and sulfur trioxid produced by the decomposition of the acid sulfate, and conducting the sulfur trioxid thus produced into contact with the portion of the mixture near the beginning of the progressive heating and which contains the sulfur trioxid absorption agent, so that the sulfur trioxid is absorbed by such agent.

3. The herein described process of obtaining soluble potassium salts, which consists in progressively heating a mixture of an insoluble potassium containing silicate, an acid sulfate decomposable by heat, and water, whereby the portion of the mixture near the end of the progressive heating is dried and heated to a reaction temperature for producing sulfur trioxid by the decomposition of the acid sulfate, and conducting the sulfur trioxid thus produced into contact with the portion of the mixture near the beginning of the progressive heating and which contains the water, so that the sulfur trioxid is absorbed by the water.

4. The herein described process of obtaining soluble potassium salts, which consists in progressively heating a mixture containing an insoluble potassium containing silicate, an alkali metal acid sulfate, and a sulfur trioxid absorption agent, whereby the portion of the mixture near the end of the progressive heating is heated to a reaction temperature and sulfur trioxid produced by the decomposition of the alkali metal acid sulfate, and conducting the sulfur trioxid thus produced into contact with the portion of the mixture near the beginning of the progressive heating and which contains the sulfur trioxid absorption agent, so that the sulfur trioxid is absorbed by such agent.

5. The herein described process of obtaining soluble potassium salts, which consists in progressively heating an insoluble potassium silicate and an alkali metal sulfate, in the presence of a sulfur trioxid absorption agent and a reducing agent, whereby the portion of the mass near the end of the progressive heating is heated to a reaction temperature and sulfur trioxid produced by the decomposition of the alkali metal acid sulfate, and conducting the sulfur trioxid thus produced into contact with the portion of the mass near the beginning of the progressive heating and which contains the sulfur trioxid absorption agent, so that the sulfur trioxid is absorbed by the sulfur trioxid absorption agent.

6. The process of obtaining soluble potassium salts which consists, in progressively heating a mixture containing an insoluble potassium containing silicate, an alkali metal acid sulfate, and water, whereby the portion of the mixture near the end of the progressive heating is heated to a reaction temperature for producing sulfur trioxid by the decomposition of the alkali metal acid sulfate, and conducting the sulfur trioxid thus produced into contact with the portion of the mixture near the beginning of the progressive heating and which contains the water, so that the sulfur trioxid is absorbed by the water.

7. The herein described process of obtaining soluble potassium salts, which consists in progressively heating a mixture containing insoluble potassium containing silicate, a materially smaller amount by weight of sodium acid sulfate, and a sulfur trioxid absorption agent, whereby the portion of the mixture near the end of the progressive heating is heated to a reaction temperature for producing sulfur trioxid by the decomposition of the sodium acid sulfate, and conducting the sulfur trioxid thus produced into contact with the portion of the mixture near the beginning of the progressive heating and which contains the sulfur trioxid absorption agent, so that the sulfur trioxid is absorbed by such agent.

8. The process of recovering potash from green sand marl, feldspar, or other potassium silicate wherein potassium is present in an insoluble form, which consists in progressively heating a mixture of a potassium containing silicate and sodium acid sulfate in the presence of water, whereby the portion of the mixture near the end of the progressive heating is heated to a reaction temperature for producing sulfur trioxid by the decomposition of the sodium acid sulfate, and causing the sulfur trioxid thus produced to contact with the portion of the mixture near the beginning of the progressive heating and which contains the water, so that the sulfur trioxid is absorbed by the water, and separating the soluble portion from the remaining portion of the resulting mixture.

In testimony whereof I affix my signature in presence of two witnesses.

HARRY P. BASSETT.

Witnesses:
PH. H. HOFFMAN,
C. H. SLATER.